US012300021B2

(12) United States Patent
Kato

(10) Patent No.: US 12,300,021 B2
(45) Date of Patent: May 13, 2025

(54) VIDEO PROCESSING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Kimimaru Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 17/951,954

(22) Filed: Sep. 23, 2022

(65) Prior Publication Data

US 2023/0108023 A1    Apr. 6, 2023

(30) Foreign Application Priority Data

Oct. 5, 2021    (JP) .................................. 2021-164293

(51) Int. Cl.
  *G06V 40/10*    (2022.01)
  *G06V 10/56*    (2022.01)
  (Continued)

(52) U.S. Cl.
  CPC .............. *G06V 40/15* (2022.01); *G06V 10/56* (2022.01); *G06V 20/40* (2022.01); *G06V 40/166* (2022.01)

(58) Field of Classification Search
  CPC ........ G06V 40/15; G06V 10/56; G06V 20/40; G06V 40/166
  See application file for complete search history.

(56) References Cited

U.S. PATENT DOCUMENTS 10,595,732 B2    3/2020 Jones et al. ........ A61B 5/02108
2019/0125197 A1*  5/2019 Fukuda ................ A61B 5/0077
(Continued)

FOREIGN PATENT DOCUMENTS

JP    2021-023490    2/2021
JP    6911609 B2    7/2021

OTHER PUBLICATIONS

Cho Dongrae et al: "Non-contact robust heart rate estimation using HSV color model and matrix-based IIR filter in the face video imaging", 2016 38th Annual International Conference of the IEEE Engineering in Medicine and Biology Society (EMBC), IEEE, Aug. 16, 2016 (Aug. 16, 2016), pp. 3847-3850, XP032980009, DOI:10.1109/EMBC.2016.7591567.

(Continued)

*Primary Examiner* — Quang N Vo
(74) *Attorney, Agent, or Firm* — Venable LLP

(57) ABSTRACT

This disclosure provides a video processing apparatus that detects biometric information of an object from a video of the object composed of a plurality of time-series images, wherein the apparatus comprises an acquiring unit which receives the video input thereto, and acquires a skin area of an object; a determining unit which determines correction coefficients based on a color of the skin area and a color indicating a target hue, the correction coefficients being for approximating a hue of pixels in the skin area to the target hue; a correcting unit which corrects, with use of the correction coefficients, the pixels in the skin area in each of the frames composing the video; and a detecting unit which detects biometric information of the object based on time-series images of the skin area after the correction by the correcting unit.

12 Claims, 8 Drawing Sheets

FIG. 2

(51) Int. Cl.
  *G06V 20/40* (2022.01)
  *G06V 40/16* (2022.01)

(56) References Cited

U.S. PATENT DOCUMENTS

| 2020/0260956 A1 | 8/2020 | Lee et al. ............. A61B 5/0022 |
| 2021/0030285 A1 | 2/2021 | Fukuda et al. ...... A61B 5/02108 |
| 2021/0089786 A1* | 3/2021 | Kon ...................... G06T 7/0012 |

OTHER PUBLICATIONS

Gill R. Tsouri et al: "On the benefits of alternative color spaces for noncontact heart rate measurements using standard red-green-blue cameras", Journal Of Biomedical Optics, vol. 20, No. 4, Apr. 15, 2015 (Apr. 15, 2015), p. 048002, XP055630415, 1000 20th st. Bellingham WA 98225-6705 USA ISSN: 1083-3668., DOI: 10.1117/1.JBO.20.4.048002.
Cardani Darrin: "Adventures in HSV Space", Dec. 31, 2001 (Dec. 31, 2001), pp. 1-10, XP93019423, Retrieved from the Internet: URL:http://robotlab.itk.ppke.hu/~rakadam/hsvspace.pdf.
Extended European Search Report dated Feb. 8, 2023 in counterpart EP Application No. 22196516.3.

* cited by examiner

FIG. 7

| R CORRECTION TARGET VALUES | G CORRECTION TARGET VALUES | B CORRECTION TARGET VALUES | H CORRECTION TARGET VALUES |
|---|---|---|---|
| 127 | 63 | 63 | 0 |
| 127 | 74 | 63 | 10 |
| 127 | 85 | 63 | 20 |
| 127 | 95 | 63 | 30 |
| 127 | 106 | 63 | 40 |
| 127 | 116 | 63 | 50 |
| 127 | 127 | 63 | 60 |
| 116 | 127 | 63 | 70 |
| 106 | 127 | 63 | 80 |
| 95 | 127 | 63 | 90 |
| 85 | 127 | 63 | 100 |
| 74 | 127 | 63 | 110 |
| 63 | 127 | 63 | 120 |
| 63 | 127 | 74 | 130 |
| 63 | 127 | 85 | 140 |
| 63 | 127 | 95 | 150 |
| 63 | 127 | 106 | 160 |
| 63 | 127 | 116 | 170 |
| 63 | 127 | 127 | 180 |
| 63 | 116 | 127 | 190 |
| 63 | 106 | 127 | 200 |
| 63 | 95 | 127 | 210 |
| 63 | 85 | 127 | 220 |
| 63 | 74 | 127 | 230 |
| 63 | 63 | 127 | 240 |
| 74 | 63 | 127 | 250 |
| 85 | 63 | 127 | 260 |
| 95 | 63 | 127 | 270 |
| 106 | 63 | 127 | 280 |
| 116 | 63 | 127 | 290 |
| 127 | 63 | 127 | 300 |
| 127 | 63 | 116 | 310 |
| 127 | 63 | 106 | 320 |
| 127 | 63 | 95 | 330 |
| 127 | 63 | 85 | 340 |
| 127 | 63 | 74 | 350 |

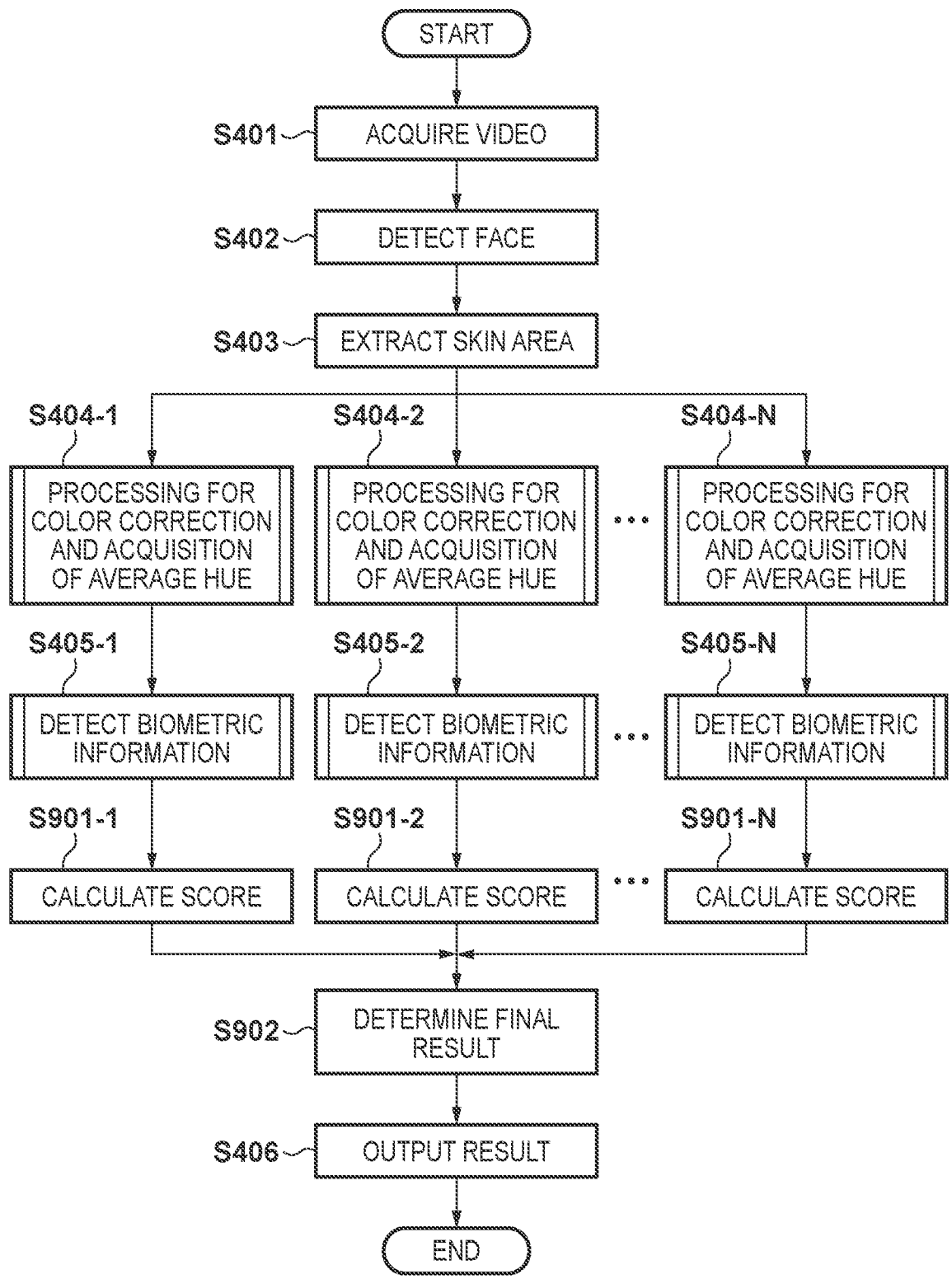

VIDEO PROCESSING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to a technique to detect biometric information from a video that includes an object.

Description of the Related Art

There are techniques to acquire biometric information by observing, in a video that includes an object, a pulse-caused color change on the skin of that object. Especially, a technique to acquire hue from the skin as color information has high robustness against noise caused by a motion of an object.

The document Japanese Patent Laid-Open No. 2021-23490 suggests a method of acquiring biometric information, such as pulse, from a video based on hue in a skin area of an object.

However, the intensity of a cyclic signal associated with hue based on a pulse-caused color change on the skin is influenced by the magnitude of the value of hue.

Although the aforementioned document discloses a configuration that corrects a color, this correction is intended to correct the color of a video to a natural color that is not attributed to the color of lighting based on the retinex theory, and to acquire biometric information while keeping robustness against the color of lighting.

SUMMARY OF THE INVENTION

The present invention is intended to provide a technique that makes it possible to detect biometric information with higher accuracy than before.

The present invention in its first aspect provides a video processing apparatus that detects biometric information of an object from a video of the object composed of a plurality of time-series images, the apparatus comprising: an acquiring unit configured to receive the video input thereto, and acquire a skin area of an object; a determining unit configured to determine correction coefficients based on a color of the skin area acquired by the acquiring unit and a color indicating a target hue, the correction coefficients being for approximating a hue of pixels in the skin area acquired by the acquiring unit to the target hue; a correcting unit configured to correct, with use of the correction coefficients, at least the pixels in the skin area in each of the frames composing the video; and a detecting unit configured to detect biometric information of the object based on time-series images of the skin area after the correction by the correcting unit.

The present invention makes it possible to acquire biometric information with higher accuracy.

Further features of the present invention will become apparent from the following description of exemplary embodiments (with reference to the attached drawings).

BRIEF DESCRIPTION OF THE DRAWINGS

FIG. 7 is a diagram showing a correspondence table of H correction target values and RGB correction target values.

FIG. 9 is a flowchart showing processing executed by the video processing apparatus according to a second embodiment.

DESCRIPTION OF THE EMBODIMENTS

Figure 1:
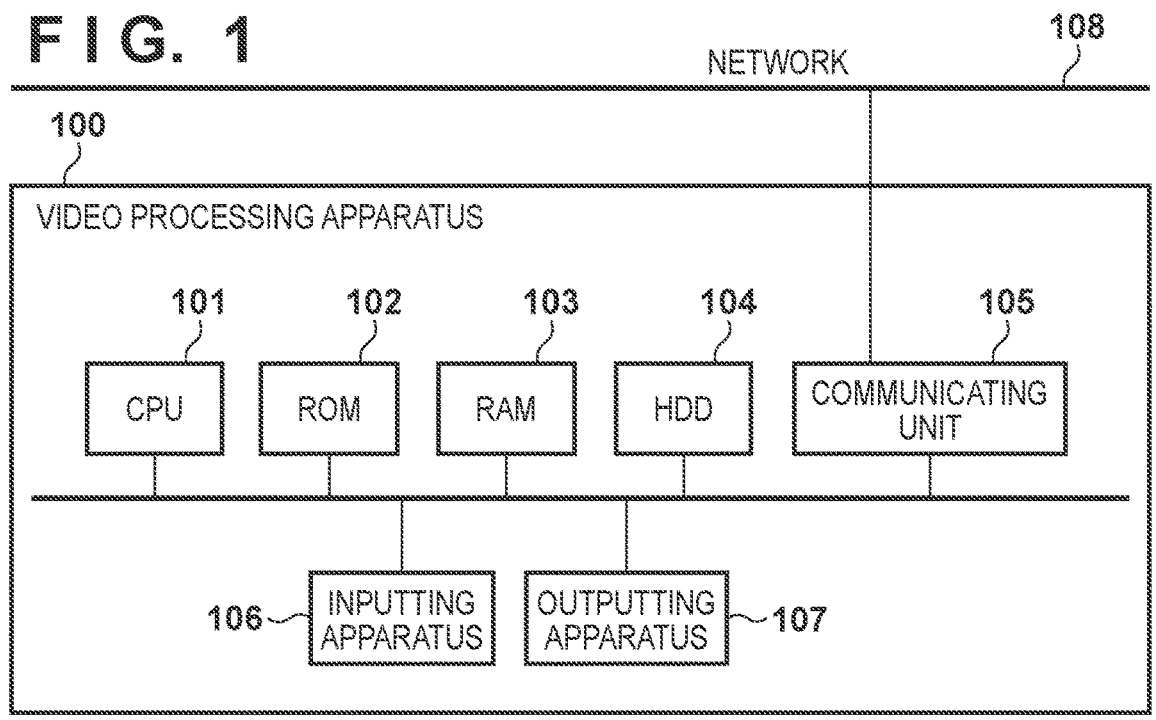
FIG. 1 is a block diagram showing examples of hardware constituents of a video processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a diagram showing examples of hardware constituents of a video processing apparatus 100. The video processing apparatus 100 includes a CPU 101, a ROM 102, a RAM 103, a hard disk drive (HDD) 104, a communicating unit 105, an inputting apparatus 106, and an outputting apparatus 107. The communicating unit 105 is connected to a network 108.

The CPU 101 executes various types of processing by reading out a control program recorded on the ROM 102. The RAM 103 is used as a temporary storage area, such as a main memory and a working area. The HDD 104 is used for long-term storage of data. The communicating unit 105 is a circuit that performs communication via the network 108. The inputting apparatus 106 is an apparatus for inputting instructions and data from outside to the video processing apparatus 100. Specifically, it is, for example, a camera for acquiring a video, or a keyboard, a mouse, or a touchscreen for accepting a user input. The outputting apparatus 107 is an apparatus for outputting instructions and data from the video processing apparatus 100 to the outside. Specifically, it is, for example, a device intended for display, such as a display that displays a result, or an interface for outputting a determination result to an external apparatus.

Note that in a case where the video processing apparatus 100 is functionally unnecessary, not all of the components shown in FIG. 1 need to be necessarily provided. For example, in a case where inputting to and outputting from the outside are entirely performed using another device that is mutually connected via the network 108, the inputting apparatus 106 and the outputting apparatus 107 are unnecessary. Furthermore, components that are not shown in FIG. 1 may also be provided. For example, video processing may be executed using a GPU (graphical processing unit) or an FPGA (Field Programmable Gate Array).

As described above, the hardware constituents of the video processing apparatus 100 are similar to the hardware constituents of a personal computer (PC). Therefore, various types of functions realized on the video processing apparatus 100 can be implemented as application software executed on the PC. That is to say, the video processing apparatus 100 can realize various types of functions of the video processing apparatus 100, as well as flowcharts to be described later, as a result of the CPU 101 executing a program.

Figure 2:
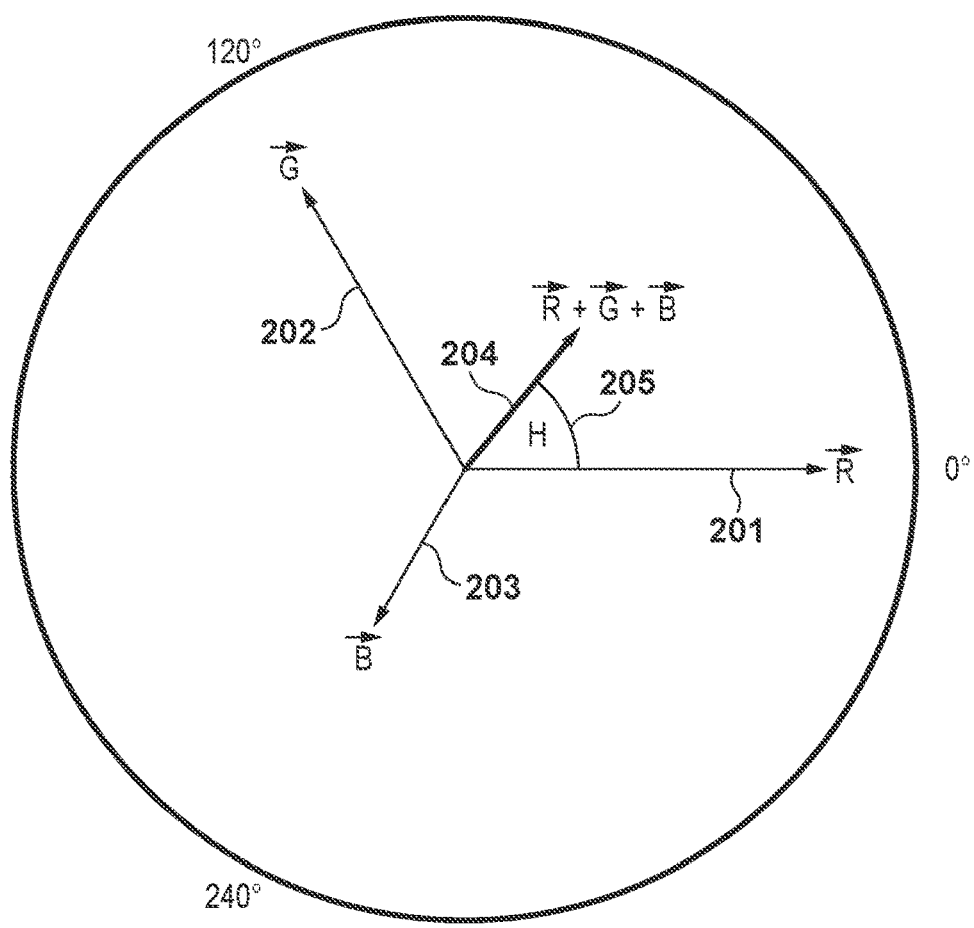
FIG. 2 is a conceptual diagram of a method of calculating hue H from RGB.

With reference to FIG. 2, a description is now given of a general method of calculating hue H from an R component value, a G component value, and a B component value.

Pixels that compose a digital color image are often represented by luminance information of respective color components of R (red), G (green), and B (blue). In a case where hue H is calculated from RGB luminance information, it is common to use the following method.

First, an R vector 201, a G vector 202, and a B vector 203 are defined as follows on a two-dimensional plane shown in FIG. 2. The R vector 201 is a vector having a direction of 0°, and a magnitude of R luminance. The G vector 202 is a vector having a direction of 120°, and a magnitude of G luminance. The B vector 204 is a vector having a direction of 240°, and a magnitude of B luminance. Then, one pixel can be specified by a sum vector 204 of the R vector 201, G vector 202, and B vector 203. Here, the direction of the sum vector 204 (in the figure, an angle 205 relative to an R axis) is hue H.

When hue H of a target area within an image has been derived in the foregoing manner, a change in hue H becomes noticeable in a case where there are chronological color changes in the direction that is near-vertical to the direction of the sum vector 204.

For example, consider a case where only G luminance is chronologically changing among RGB luminance. In this case, an image indicated by hue at 30° or 210°, which is the direction perpendicular to the direction indicated by G luminance (the direction vertical to 120°, which is the direction of the G vector 202), is an image sensitive to a chronological change in G components. In contrast, in the case of an image indicated by hue near 120° or 300° (the direction parallel to 120°, which is the direction of the G vector 202), a change in hue corresponding to a chronological change in G components is small, and it is difficult to detect the change in hue.

In view of the above consideration, in a case where a pulse-caused color change on the skin is near-vertical to H (the direction of the sum vector 204) in FIG. 2, a pulse-caused displacement included in time-series data of H is large. In view of this, the present embodiments make it possible to acquire a pulse-caused color change in a more favorable manner by correcting a skin color in an image to a hue value that is ideal for such detection of biometric information.

Hue values that have been experimentally derived as values ideal for the detection of biometric information are specifically 50°, 230°, and the vicinities thereof.

Figure 8:
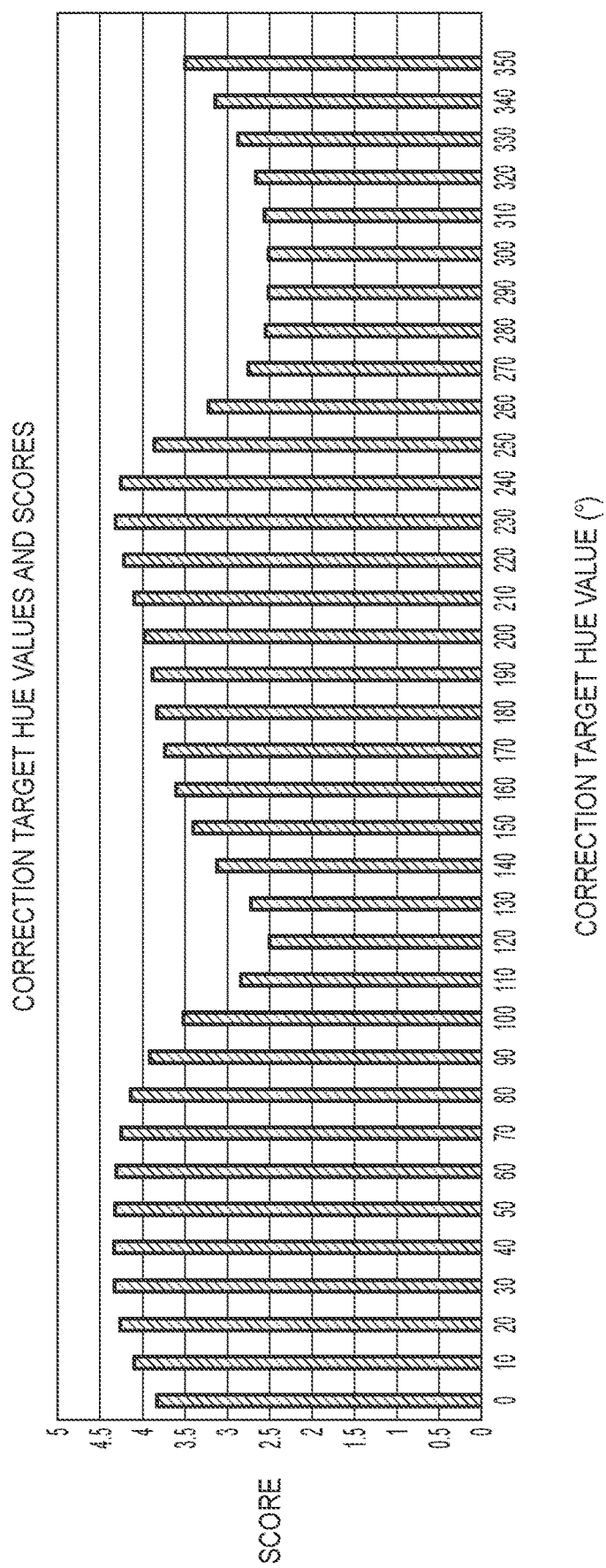
FIG. 8 is a diagram showing a graph indicating a relationship between correction target hue values and scores based on a prior experiment.

FIG. 8 is a graph indicating a relationship between correction target hue values and average scores in the result of a prior experiment in which color correction was performed with respect to a plurality of videos while setting correction target hue values at an interval of 10°. The color correction method will be explained later in the description of a first embodiment that uses FIG. 5. As a result of color correction processing, an average hue value of a skin area becomes a value close to a correction target hue value. Also, the score calculation method will be explained later in the description of a second embodiment that uses FIG. 9. A score indicates a relative intensity of a cyclic component attributed to a pulse wave in the entire hue information; it can be said that the higher the score in FIG. 8, the more enhanced the signal attributed to the pulse wave. In the graph, the scores corresponding to the correction target hue values of 50°, 230°, and the vicinities thereof are high, and it is apparent that these hue values are ideal for the detection of biometric information.

First Embodiment

Figure 3:
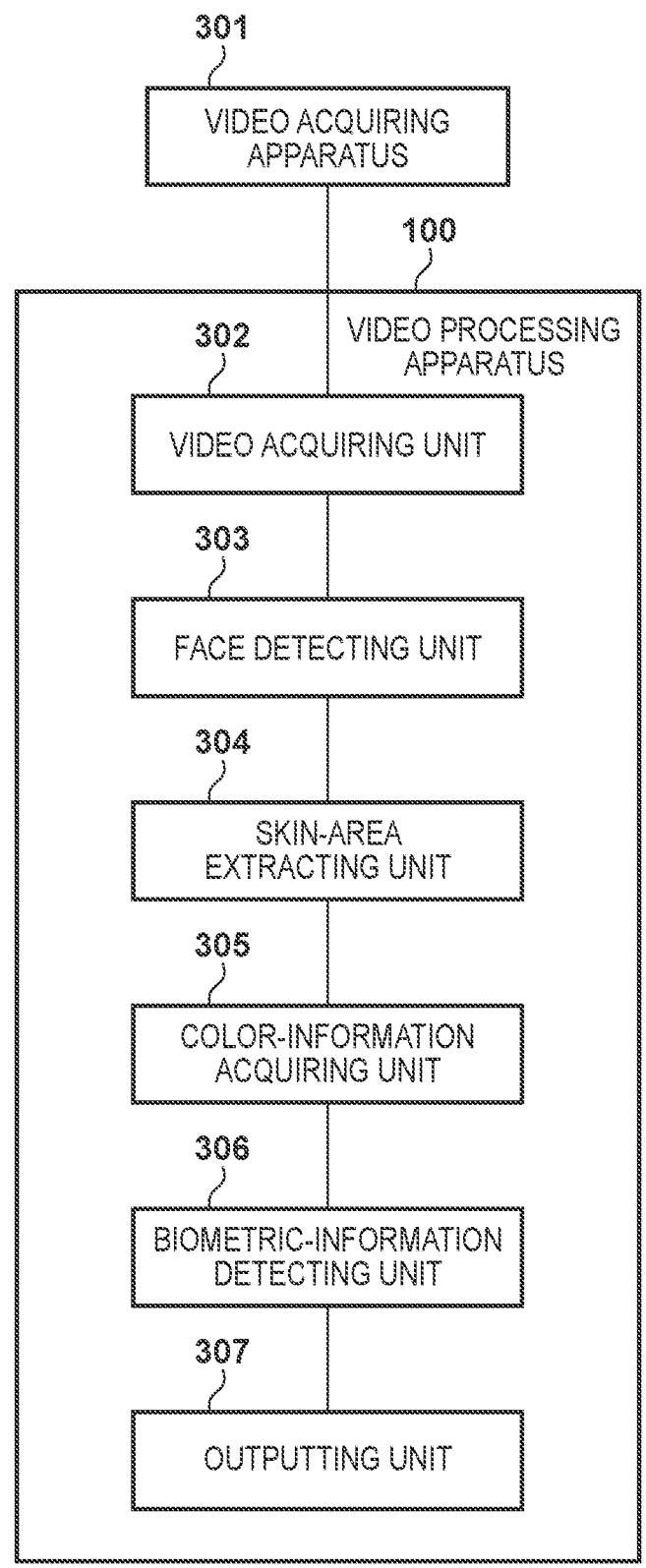
FIG. 3 is a block diagram showing examples of functional constituents of the video processing apparatus.

FIG. 3 is a block diagram showing functional constituents mounted on the video processing apparatus 100 of FIG. 1 according to an embodiment. Each of the blocks shown therein can be realized by elements and mechanical apparatuses, such as a CPU of a computer, as hardware, and is realized by a computer program and the like as software; here, functional blocks that are realized by coordination therebetween are shown. Therefore, it is to be understood by a skilled person who has been exposed to the present specification that these functional blocks can be realized in a variety of forms using a combination of hardware and software.

The video processing apparatus 100 includes a video acquiring unit 302, a face detecting unit 303, a skin-area extracting unit 304, a color-information acquiring unit 305, a biometric-information detecting unit 306, and an outputting unit 307. Also, the video processing apparatus 100 is connected to a video acquiring apparatus 301 via the network 108. Note that it may be connected to the video acquiring apparatus 301 via inputting and outputting interfaces included in the inputting apparatus 106 and the outputting apparatus 107, rather than the network 108. Also, the video acquiring apparatus 301 may be provided inside the video processing apparatus 100.

Next, each component will be described. The video acquiring apparatus 301 is typically an image capturing apparatus, a representative example of which is a video camera. The video acquiring apparatus 301 shoots an object from which biometric information is to be detected at an appropriate frame rate, and transmits video data acquired through the shooting to the video processing apparatus 100 via the network 108. When transmitting video data acquired through the shooting, the video acquiring apparatus 301 may apply moving image encoding of any format, such as Motion JPEG and H.264, in order to reduce the amount of data to be transmitted.

Note that it is necessary for the length of time of a video acquired by the video acquiring apparatus 301 to exceed a cycle indicated by biometric information. It is assumed in the embodiment that, as pulses are detected as biometric information, the video acquiring apparatus 301 shoots an object image corresponding to, for example, 10 seconds that includes several pulses. Note that it is assumed in the embodiment that the video acquiring apparatus 301 shoots each of color components R, G, B that compose one pixel with an accuracy of 8 bits (256 tones).

The video acquiring unit 302 acquires video data from the image capturing apparatus 301 via the network 108, and supplies the acquired video data to the face detecting unit 303 in a later stage.

The face detecting unit 303 detects a face of an object from the video data from the video acquiring unit 302, and supplies information that specifies an area of the detected face to the skin-area extracting unit 304. Any method can be used as a face detection method. For example, it is permissible to use a detector that detects an area of a human face from an image that has been learned through deep learning. In terms of a representation of a detection result on a computer, it is common to acquire the coordinates of a circumscribed quadrilateral that exactly includes a face on an image with respect to each frame in a video, but other forms may be used.

The skin-area extracting unit 304 extracts a skin area in units of pixels with respect to a facial area of the video, and supplies information indicating the extracted skin area to the color-information acquiring unit 305. Any method can be used to extract the skin area. For example, the color representation of the video may be converted into the HSV format, and a group of pixels in which H, S, and V take values within a specific range that has been determined in advance may be used as a skin area. Alternatively, on the precondition that a skin area accounts for a large portion of a facial area, pixels that statistically act as outliers based on the HSV values of all pixels within the facial area may be excluded, and a group of remaining pixels may be used as a skin area. Other than these, it is also permissible to use an extractor that has been learned through deep learning and extracts a skin area of a person in units of pixels. In terms of a representation of the result of skin area extraction on a computer, a "mask image", in which pixels of a skin area have a value of 1 and other pixels have a value of 0, can be used.

The color-information acquiring unit 305 performs color correction with respect to the skin area in the video based on the information from the skin-area extracting unit 304 so that a color change attributed to a pulse wave is enhanced in time-series data of average hue values, and then acquires an average hue value. The color correction is performed by multiplying respective pixel values of R, G, and B by correction coefficients. The correction coefficients are calculated using respective average values of R, G, and B within a skin area in a predetermined frame included in the video, and respective correction target values of R, G, and B that have been set in advance. The correction target values of R, G, and B are determined from a correction target value of H (a correction target hue value) based on the correspondence table shown in FIG. 7. The correction target hue value is determined by a designer based on the result of the prior experiment of FIG. 8. A specific method according to the embodiment will be described later using a flowchart.

Using the time-series data of average hue values, the biometric-information detecting unit 306 detects biometric information based on a pulse wave. Any detectable entity can be detected as biometric information from a pulse wave with use of a known method. Examples thereof include a pulse rate (to be exact, the number of pulses per minute), blood pressure, a stress index, and so forth. Also, biometric determination information that determines "whether an object is a living organism or a non-living organism such as a photograph" by using, for example, the intensity of a pulse wave as an index, may be used as biometric information. This can be utilized to prevent spoofing in which a photograph of another person is used in a face authentication system. In the present embodiment, as an example, a pulse rate of an object is detected as biometric information. A specific method of detecting a pulse rate will be described later using a flowchart.

The outputting unit 307 outputs the biometric information detected by the biometric-information detecting unit 306 (in the embodiment, the pulse rate). For example, the biometric information is displayed on a display that is connected as the outputting apparatus 107.

Figure 4:
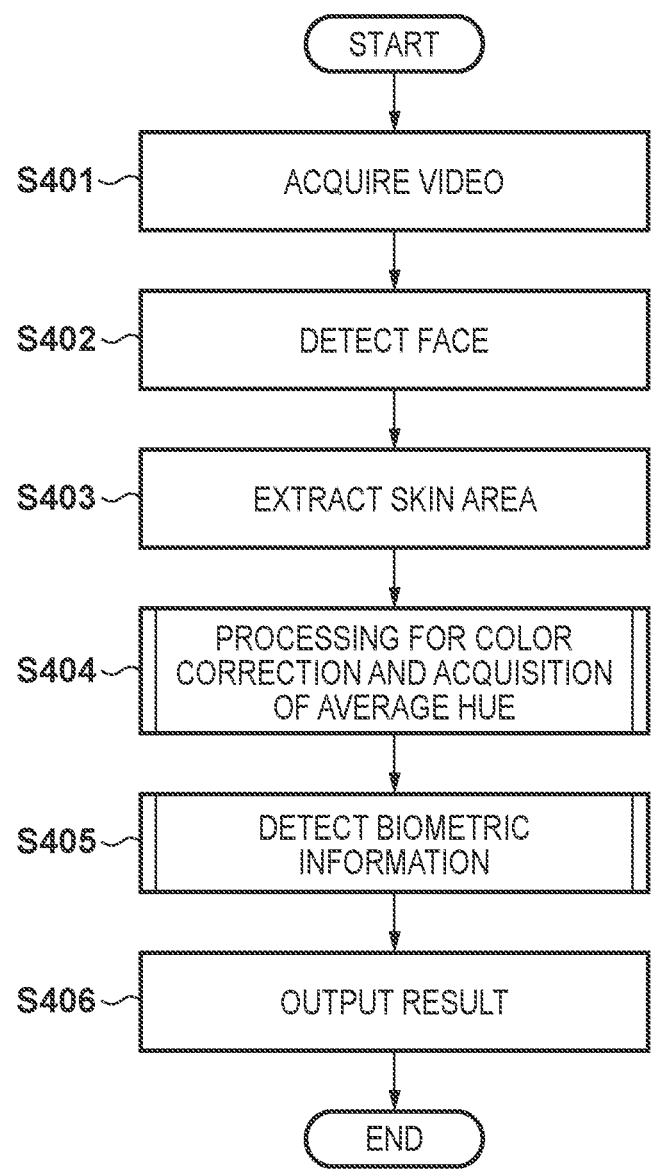
FIG. 4 is a flowchart showing processing executed by the video processing apparatus.

FIG. 4 is a flowchart showing processing executed by the video processing apparatus 100 according to the embodiment. The following describes a flow of biometric information detection processing of the video processing apparatus 100 with reference to this figure. In the following description, the notation of processes (steps) is omitted by mentioning each process (step) with S added to the beginning thereof. Note that the video processing apparatus 100 need not necessarily perform every step described in this flowchart.

After the processing has been started (e.g., after the power of the video processing apparatus 100 has been turned ON), the video acquiring unit 302 acquires, from the video acquiring apparatus 301, video data that has been acquired by shooting an object in step S401.

In step S402, the face detecting unit 303 detects a face of the object within the acquired video data. As a result, with respect to each frame of the video, the coordinates of a quadrilateral that exactly includes the face (typically, a circumscribed quadrilateral) are acquired.

In step S403, the skin-area extracting unit 304 extracts a skin area with respect to an area of the detected face. As a result, with respect to each frame of the video, a group of pixels that account for the skin area within the facial area is acquired.

In step S404, the color-information acquiring unit 305 performs color correction processing and processing for acquisition of an average hue value with respect to the extracted skin area. The color correction processing is processing for bringing the average hue value of the skin area close to a hue value that is ideal for detection of biometric information. A specific procedure will be described later using a flowchart of FIG. 5. This processing is performed with respect to each frame of the video; as a result, time-series data of average hue values is acquired.

In step S405, the biometric-information detecting unit 306 calculates biometric information of the object (in the embodiment, a pulse rate) as biometric information based on the time-series data of average hue values. A specific procedure will be described later using a flowchart of FIG. 6.

In step S406, the outputting unit 307 outputs the pulse rate of the object that was acquired in step S405. Although the output destination is the outputting apparatus 107 (display apparatus), it may be a storage apparatus as the calculated biometric information is stored as a file.

Figure 5:
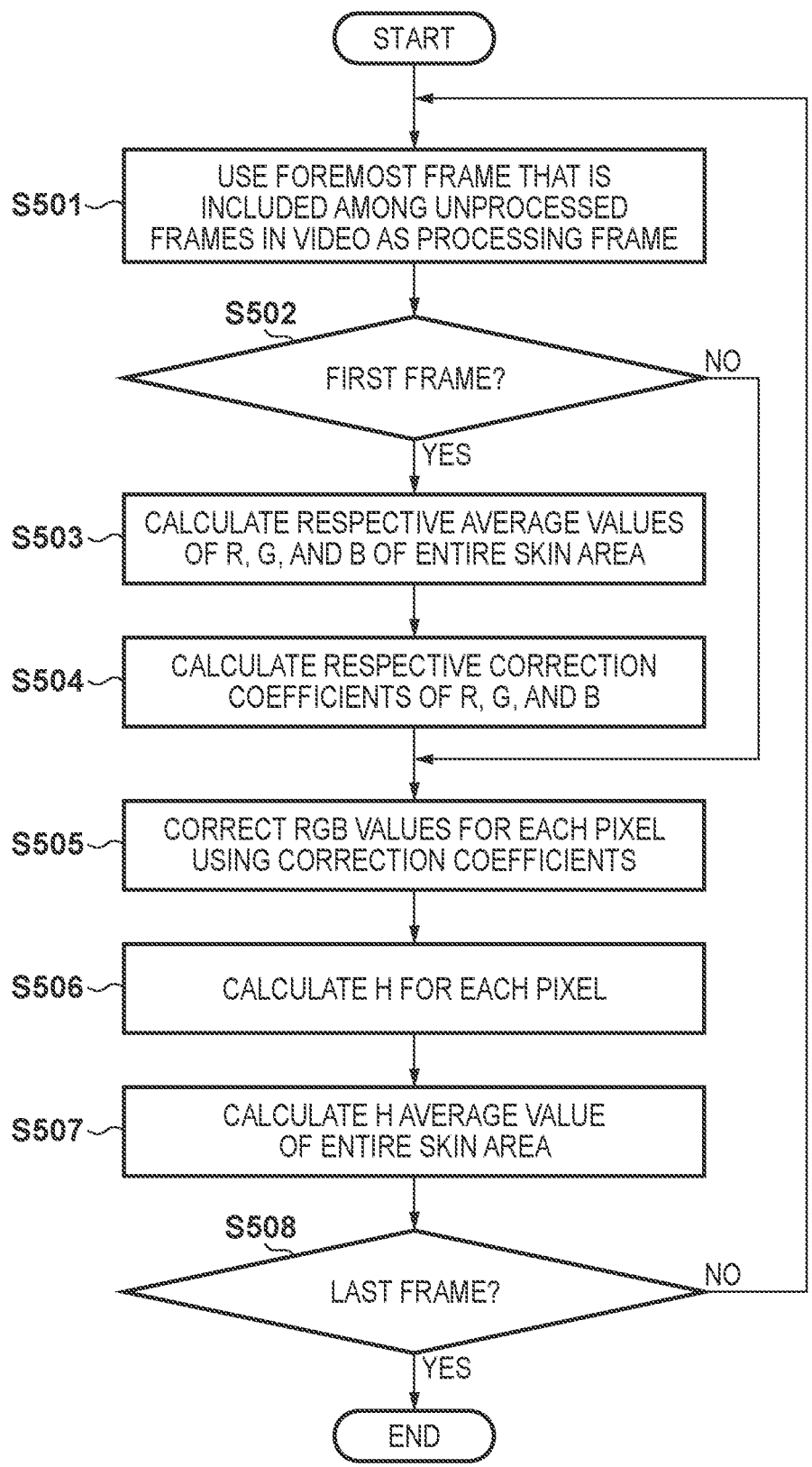
FIG. 5 is a flowchart showing processing for color correction and acquisition of an average hue executed by the video processing apparatus.

FIG. 5 is a flowchart for describing processing of step S404 executed by the color-information acquiring unit 305 in the embodiment. With reference to this figure, the following describes a flow of the processing for color correction and acquisition of the average hue of the color-information acquiring unit 305.

In step S501, the color-information acquiring unit 305 uses the foremost, first frame that is included among unprocessed frames in the video as a processing target frame. Subsequent processing will be executed with respect to the processing target frame that has been set here.

In step S502, the color-information acquiring unit 305 determines whether the processing target frame that is currently processed is the first frame (foremost frame) of the video. This is processing for determining whether it is a frame that has been set to be used for calculation of correction coefficients; in the present embodiment, the first frame is used to calculate correction coefficients. The color-information acquiring unit 305 causes processing to proceed to step S503 in a case where the processing target frame is the first frame, and to step S505 in a case where the processing target frame is a frame other than the first frame.

In step S503, the color-information acquiring unit 305 calculates average values of R, G, and B values of all pixels included in a skin area in the processing target frame. Hereinafter, the average value of R, the average value of G, and the average value of B are denoted as aveR, aveG, and aveB, respectively.

In step S504, the color-information acquiring unit 305 calculates correction coefficients Ar, Ag, and Ab in accordance with the following expressions (1) to (3).

$$Ar = \frac{tagR}{aveR} \quad (1)$$

$$Ag = \frac{tagG}{aveG} \quad (2)$$

$$Ab = \frac{tagB}{aveB} \quad (3)$$

In the expressions, tagR, tagG, and tagB are correction target values of R, G, and B, respectively, and are values that have been set in the color-information acquiring unit 305 in advance. A designer sets a correction target hue value in advance; accordingly, the respective correction target values tagR, tagG, and tagB of R, G, and B are automatically set by the color-information acquiring unit 305 based on the correction target hue value (H correction target value) and the correspondence table of FIG. 7. The designer sets a hue value that is ideal for detection of biometric information as a corrected hue target value in the color-information acquiring unit 305. Note that it has been confirmed, from the result of the prior experiment shown in FIG. 8, that it is favorable to use the correction target hue values of 50°, 230°, and the vicinities thereof. In the embodiment, 50° is set as the correction target hue value. Therefore, in the case of the embodiment, "127", "116", and "63" are respectively set as the correction target value of R (tagR), the correction target value of G (tagG), and the correction target value of B (tagB) based on the correspondence table of FIG. 7. Note that the respective correction target values of R, G, and B may be set directly in the color-information acquiring unit 305, instead of the designer setting the corrected hue target value. Also, FIG. 7 depicts one example of the correspondence between the correction target values of R, G, and B and the correction target value of H, and the correspondence need not necessarily be in this way.

In step S505, using the correction coefficients Ar, Ag, and Ab, the color-information acquiring unit 305 corrects RGB values of each pixel in the skin area of the target frame. Specifically, component values of R, G, and B of the pixels within the skin area are respectively multiplied by the correction coefficients Ar, Ag, and Ab in accordance with the following expressions (4) to (6), thereby acquiring corrected component values R', G', and B'. Hereinafter, R', G', and B' are used as RGB pixel values of the pertinent pixel.

$$R' = Ar \times R \quad (4)$$

$$G' = Ag \times G \quad (5)$$

$$B' = Ab \times B \quad (6)$$

In step S506, the color-information acquiring unit 305 calculates a hue value H of each pixel. The hue value H is calculated from the RGB values of the pixel in accordance with the following expression (7). Here, the RGB values of the pixel are the values corrected in step S505 (R', G', and B').

$$MIN = \min(R, G, B) \quad (7)$$
$$MAX = \max(R, G, B)$$

$$H = \begin{cases} \text{undefined, if MIN} = \text{MAX} \\ 60 \times \frac{G-R}{MAX-MIN} + 60, \text{ if MIN} = B \\ 60 \times \frac{B-G}{MAX-MIN} + 180, \text{ if MIN} = R \\ 60 \times \frac{R-B}{MAX-MIN} + 300, \text{ if MIN} = G \end{cases}$$

In step S507, the color-information acquiring unit 305 calculates an H average value of the entire skin area. The H average value is derived by averaging H of pixels derived in step S506 with respect to the entire skin-color area.

In step S508, the color-information acquiring unit 305 determines whether the frame that has been processed is the last frame of the video. In a case where the frame is not the last frame, the color-information acquiring unit 305 causes processing to return to step S501 in order to set the next frame as a processing target. Then, the color-information acquiring unit 305 repeats processing of steps S501 to 507 until it determines that processing has been completed with respect to every frame. In a case where it is determined that the frame is the last frame in step S507, the color-information acquiring unit 305 ends the processing for color correction and acquisition of the average hue.

As a result of the foregoing, the hue of the skin area of the object in each frame was able to be converted into the hue that has been approximated to the corrected hue target value while enclosing the influence of pulses. That is to say, time-series image data of the skin area with hue that has been approximated to the corrected hue target value was able to be generated.

Note that in the above description, the first frame is used as a representative frame for calculating the respective average values of R, G, and B in the skin area and determining the respective correction coefficients thereof; however, another frame may be used, and a plurality of frames may be used. In this case, processing of steps S502 to S504 should be changed accordingly. Also, as the correction coefficients need to be determined in order to execute processing of step S505 onward, in a case where a frame other than the first frame is used in processing of steps S502 to S504, the order of frames to be processed, and of processes, should be set appropriately. For example, in a case where a video that is captured in real time is processed, it is favorable to use the first frame in determining the correction coefficients as in the embodiment. On the other hand, in a case where a video is first stored into and preserved in the HDD 104 and then processed later, it is also possible to execute processing of steps S502 to S504 while using the frames of the entire video in determining the correction coefficients, and then execute processing of step S505 onward with respect to each frame.

Figure 6:
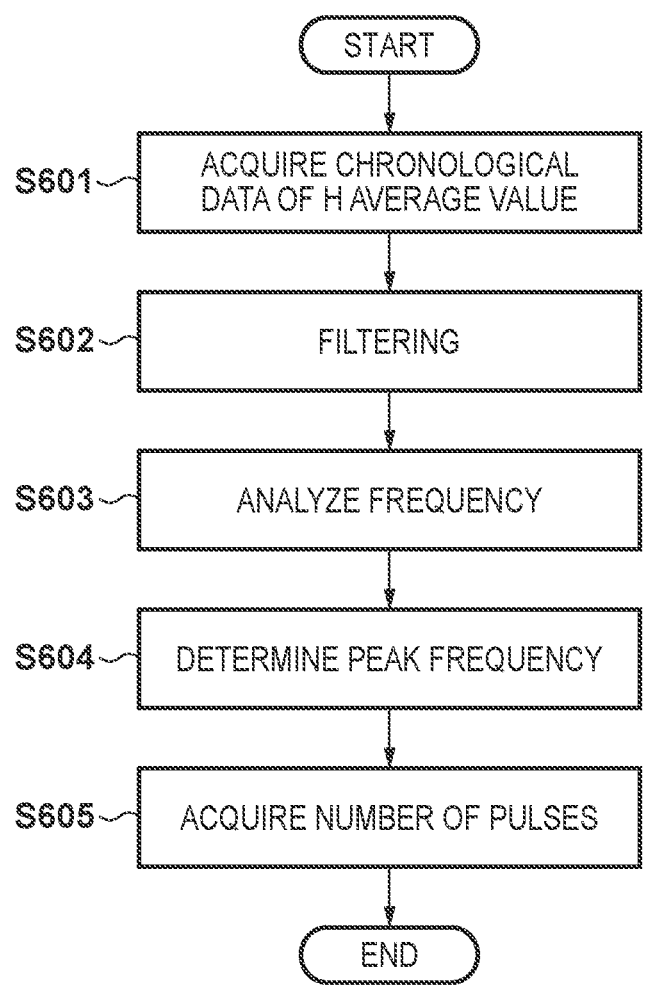
FIG. 6 is a flowchart showing biometric information detection processing executed by the video processing apparatus.

FIG. 6 is a flowchart showing the details of processing of step S405 executed by the biometric-information detecting unit 306 in the embodiment. With reference to this figure, the following describes a flow of biometric information detection processing executed by the biometric-information detecting unit 306.

In step S601, the biometric-information detecting unit 306 acquires time-series data after hue correction, which has been generated by the color-information acquiring unit 305.

In step S602, the biometric-information detecting unit 306 applies a band-pass filter to the time-series data after hue correction. It is assumed that the band-pass filter has been designed so that frequency components in a range of a general pulse rate of a human (a range of 0.83 Hz to 3.33 Hz, which is equivalent to a range of 50 bpm (beats per minute) to 200 bpm) pass there through.

In step S603, the biometric-information detecting unit 306 acquires a frequency spectrum by performing frequency analysis with respect to the time-series data after hue correction that has been filtered. Any method, such as a fast Fourier transform, can be used in the frequency analysis.

In step S604, based on the frequency spectrum, the biometric-information detecting unit 306 determines the frequency of a frequency component that has the highest amplitude among the frequency components in the range of the general pulse rate of a human as a peak frequency.

In step S605, the biometric-information detecting unit 306 acquires the peak frequency as a pulse rate of the object, and regards the same as the result of biometric information detection.

As described above, according to the present embodiment, biometric information is detected after converting the hue of the skin of the object within the video into the hue that is close to the hue appropriate for detection of biometric information; thus, biometric information can be detected with high accuracy.

Second Embodiment

The above first embodiment has been described in relation to a method in which, with use of a correction target hue value that has been set by a designer based on a hue value that is ideal for detection of biometric information, the color of a skin area is corrected to a value close to the correction target hue value, thereby detecting biometric information of higher accuracy. The designer can determine the hue value that is ideal for detection of biometric information with reference to the result of the prior experiment of FIG. 8. However, the scores of FIG. 8 are average values from a plurality of videos, and the relationship between the correction target hue values and the scores shown in the figure indicates an overall tendency in the plurality of videos. It is not always the case that each individual video exhibits the same relationship as FIG. 8; strictly speaking, a hue value that is most ideal for detection of biometric information may vary depending on the color of lighting, the white balance of a camera, the original skin color, and so on.

In the present second embodiment, after a plurality of corrections have been performed with respect to an acquired video with use of a plurality of correction target hue values, detection of biometric information and score calculation are performed with respect to each of the results of the corrections, and the best result is determined based on these scores. This makes it possible to output the result of detection of biometric information by way of color correction that uses the optimal correction target hue value for an actual video captured.

The following describes only the differences from the first embodiment.

In the second embodiment, a designer sets a plurality of correction target hue values in the color-information acquiring unit 305.

Here, various methods are possible as a method of setting a plurality of correction target hue values. As one example, 0° to 360° may be set at a constant interval (e.g., at an interval of 10°). However, if a large number of correction target hue values are set, it may take time for the video processing apparatus 100 to complete processing with respect to all correction target hue values that have been set. Therefore, in a case where there are restrictions on the processing time period and calculation resources, such as the CPU 101, it is favorable to use a method that has a high possibility of acquiring the most ideal correction target hue value even if the number of correction target hue values that have been set is small. For example, it is possible to set the correction target hue values in the ranges which are centered at 50° and 230° that have a high possibility of exhibiting high scores in many videos, and which span over 30° before and after 50° and 230°, at a small interval (e.g., the angle difference between neighboring target hue values is 5°). Also, the number of correction target hue values to be set may be dynamically changed; for example, the interval between correction target hue values to be set may be changed depending on the resource status of a computer.

Functional constituents of the video processing apparatus 100 according to the second embodiment can be explained using FIG. 3, similarly to the first embodiment. The differences from the first embodiment are as follows.

The color-information acquiring unit 305 sets, in advance, a plurality of correction target values of R, G, and B based on a plurality of correction target hue values that have been set and the correspondence table of FIG. 7.

If N correction target hue values are to be set (where N≥2), the sets of correction target values for pixels that respectively correspond to the correction target hue values can be represented as follows.

{tagR(1),tagG(1),tagB(1)}

{tagR(2),tagG(2),tagB(2)}

{tagR(N),tagG(N),tagB(N)}

In video processing, the color-information acquiring unit 305 performs a plurality of color corrections based on the N sets of correction target values, and acquires a plurality of average hue values. As a result, N pieces of time-series data with hue that has been approximated to a corresponding one of the corrected hue target values 1 to N are generated.

From the pieces of time-series data that have hue close to the N pieces of corrected hue target values, the biometric-information detecting unit 306 detects a plurality of pieces of biometric information, and calculates N scores. Then, the biometric-information detecting unit 306 evaluates the calculated N scores, and determines the one with the best score as biometric information to be output ultimately.

Note that the color-information acquiring unit 305 and the biometric-information detecting unit 306 may additionally perform processing with respect to data to which color correction is not applied, in addition to processing with respect to data to which color correction has been applied based on the plurality of correction target values that have been set. This is a case that takes into consideration the possibility that the processing based on the original color, with no correction applied thereto, has the best result (the highest score).

FIG. 9 is a flowchart for describing processing executed by the video processing apparatus 100 according to the second embodiment.

Processing of steps S401 to S403 is the same as that of the first embodiment.

After processing of step S403, the video processing apparatus 100 executes each process, namely the processing for color correction and acquisition of the average hue in step S404, detection of biometric information in step S405, and score calculation in step S901, with respect to each of the predetermined, N different correction target hue values. In FIG. 9, the N correction target hue values are assigned numbers 1 to N, and processing that is executed for each of them is denoted by a step number followed by a hyphen and the assigned number in this order. For example, step S404-2 represents processing for color correction and acquisition of the average hue with respect to the second correction target hue value. Note that although the first to the $N^{th}$ correction target hue values are processed in parallel in the flowchart of FIG. 9, they may be processed in sequence in a loop.

Processing of each of steps S404-1 to -N is the same as step S404 according to the first embodiment. Note that the correction target hue values used in steps S404-1 to -N correspond to the numbers of their respective steps.

Processing of each of steps S405-1 to -N is the same as step S405 according to the first embodiment. Note that time-series data of the average hue values used in steps S405-1 to -N is acquired in steps S404-1 to -N.

In steps S901-1 to -N, the biometric-information detecting unit 306 calculates scores with respect to biometric information acquired in steps S405-1 to -N. Specifically, first, with respect to the frequency spectrum acquired in step S604, an average amplitude value (or an average power value) of frequency components in the range of the general pulse rate of a human is calculated. Thereafter, the amplitude value at the peak frequency determined in step S604 is divided by the foregoing average amplitude value, and the result thereof is used as a score. In this way, the relative intensity of a pulse wave in a frequency band in the range of the pulse rate of a human can be calculated as a score. Note that scores derived by other calculation methods may be used as long as a favorable result of biometric information detection can be selected by comparing the scores. For example, a squared error can be calculated with respect to a sine wave corresponding to a peak frequency with both a phase and an amplitude, as well as filtered time-series data of color information acquired in step S602, and the calculated squared error can be used as a score.

In step S902, the biometric-information detecting unit compares the scores calculated in steps S901-1 to -N, and determines the result of biometric information detection corresponding to the best score as the final result. Note that information other than the scores may be referred to in determining the final result. For example, in outputting a pulse rate as the result of biometric information detection, the final result may be selected by majority decision from among the results acquired in steps S405-1 to -N. Furthermore, it is also possible to use a method that makes a selection by majority decision from among the results with scores equal to or higher than a certain score with use of information of scores, a method that derives an average value of pulse rates with respect to the results with high scores and uses the average value as the final result, and so forth.

In step S406, the outputting unit 307 outputs the final result that was determined in step S902.

As described above, according to the present second embodiment, biometric information of an object can be detected with high accuracy irrespective of the skin color of the object and the shooting environment, such as lighting, at the time of shooting.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-164293, filed Oct. 5, 2021 which is hereby incorporated by reference herein in its entirety.

The invention claimed is:

1. A video processing apparatus that detects biometric information of an object from a video of the object composed of a plurality of time-series images, the apparatus comprising:
    an acquiring unit configured to receive the video input thereto, and acquire a skin area of an object;
    a determining unit configured to determine correction coefficients based on a color of the skin area acquired by the acquiring unit and a color indicating a target hue, the correction coefficients being for approximating a hue of pixels in the skin area acquired by the acquiring unit to the target hue;
    a correcting unit configured to correct, with use of the correction coefficients, at least the pixels in the skin area in each of the frames composing the video; and
    a detecting unit configured to detect biometric information of the object based on time-series images of the skin area after the correction by the correcting unit.

2. The apparatus according to claim 1, wherein the determining unit
    determines, as the color of the skin area, a color indicated by an average value of values of respective color components of all pixels within the skin area in a representative frame which is included in the video and which has been set in advance, and
    determines ratios between values of respective color components indicating the color of the skin area and values of respective color components indicating the color of the target hue as the correction coefficients, and the correcting unit performs the correction by multiplying values of respective color component of the pixels in the skin area by corresponding correction coefficients, respectively.

3. The apparatus according to claim 1, wherein provided that a direction of R components, a direction of G components, and a direction of B components are 0°, 120°, and 240°, respectively, the target hue indicates a direction of 50° or 230°.

4. The apparatus according to claim 1, wherein (amplitude) scores are calculated by converting the pixels in the skin area obtained from the plurality of frames into candidate hues of a plurality of patterns, and the target hue is the candidate hue that corresponds to the highest (amplitude) score.

5. The apparatus according to claim 1, wherein the determining unit determines N sets of correction coefficients based on the color of the skin area acquired by the acquiring unit and colors indicating N target hues that have been set in advance (where N≥2), the N sets of correction coefficients being for approximating the hue of the pixels in the skin area acquired by the acquiring unit to each of the N target hues,
wherein the correcting unit generates N pieces of time-series image data of the skin area by correcting at least pixels in the skin area in accordance with the N sets of correction coefficients in each of the frames composing the video, and
wherein the detecting unit determines biometric information of the object to be output by detecting N pieces of biometric information of the object based on the N pieces of time-series image data of the skin area acquired by the correcting unit and evaluating the N pieces of biometric information of the object.

6. The apparatus according to claim 5, wherein provided that a direction of R components, a direction of G components, and a direction of B components are 0°, 120°, and 240°, respectively, the N target hues are N hues which are centered at 50° or 230° and which neighbor one another at an interval of a preset angle.

7. The apparatus according to claim 1, wherein the biometric information includes at least one of a pulse rate, blood pressure, a stress index, and biometric determination information.

8. The apparatus according to claim 1, wherein the video is a video that has been captured by a visible light camera.

9. The apparatus according to claim 1, wherein based on the time-series images of the skin area after the correction by the correcting unit, the detecting unit detects the biometric information indicating a pulse estimated from an amplitude that has occurred in a first predetermined time period.

10. The apparatus according to claim 1, wherein based on the time-series images of the skin area after the correction by the correcting unit, the biometric information indicating presence or absence of a heartbeat estimated from an amplitude that has occurred in a second predetermined time period is detected.

11. A method of controlling a video processing apparatus that detects biometric information of an object from a video of the object composed of a plurality of time-series images, the method comprising:
(a) receiving the video input thereto, and acquiring a skin area of an object;
(b) determining correction coefficients based on a color of the skin area acquired in the step (a) and a color indicating a target hue, the correction coefficients being for approximating a hue of pixels in the skin area acquired in the acquiring step to the target hue;
(c) correcting, with use of the correction coefficients, at least the pixels in the skin area in each of the frames composing the video; and
(d) detecting biometric information of the object based on time-series images of the skin area after the correction in the step (c).

12. A non-transitory computer-readable storage medium storing a program which, when read and executed by a computer, caused the computer to execute the steps of a method of controlling a video processing apparatus that detects biometric information of an object from a video of the object composed of a plurality of time-series images, the method comprising:
(a) receiving the video input thereto, and acquiring a skin area of an object;
(b) determining correction coefficients based on a color of the skin area acquired in the step (a) and a color indicating a target hue, the correction coefficients being for approximating a hue of pixels in the skin area acquired in the acquiring step to the target hue;
(c) correcting, with use of the correction coefficients, at least the pixels in the skin area in each of the frames composing the video; and
(d) detecting biometric information of the object based on time-series images of the skin area after the correction in the step (c).

* * * * *